United States Patent [19]

Lent et al.

[11] Patent Number: 5,102,458
[45] Date of Patent: Apr. 7, 1992

[54] CORROSION INHIBITOR FOR JET INKS

[75] Inventors: Bruce A. Lent, Oak Park; Nikolay Shevelev, River Forest, both of Ill.

[73] Assignee: Videojet Systems International, Inc., Elk Grove Village, Ill.

[21] Appl. No.: 691,544

[22] Filed: Apr. 16, 1991

[51] Int. Cl.$^5$ .............................................. C09D 11/00
[52] U.S. Cl. ............................ 106/20; 106/14.42
[58] Field of Search ......................................... 106/20

[56] References Cited

U.S. PATENT DOCUMENTS

| | | | |
|---|---|---|---|
| 3,891,470 | 6/1975 | Kotone et al. | 148/6.14 |
| 3,925,233 | 12/1975 | Coffman et al. | 252/78 |
| 3,935,125 | 1/1976 | Jacob | 252/389 A |
| 3,964,927 | 6/1976 | Villarreal-Dominquez | 136/26 |
| 4,021,252 | 5/1977 | Banczak et al. | 106/30 |
| 4,070,322 | 1/1978 | Hwang et al. | 260/29.6 |
| 4,077,727 | 3/1978 | Kramer et al. | 401/215 |
| 4,077,807 | 3/1978 | Kramer et al. | 106/24 |
| 4,101,328 | 7/1978 | Fieser et al. | 428/624 |
| 4,161,458 | 7/1979 | Kolleth | 252/305 |
| 4,204,972 | 5/1980 | Knoblauch et al. | 252/78.1 |
| 4,210,566 | 7/1980 | Murray | 260/31.87 |
| 4,253,886 | 3/1981 | Aonuma et al. | 148/105 |
| 4,260,531 | 4/1981 | Wachtel et al. | 260/29.6 E |
| 4,295,979 | 10/1981 | Sharp et al. | 252/8.55 E |
| 4,338,209 | 7/1982 | Manabe et al. | 252/75 |
| 4,342,596 | 8/1982 | Conner, Sr. | 106/14.13 |
| 4,433,127 | 2/1984 | Sugiyama et al. | 528/17 |
| 4,455,247 | 6/1984 | Nakayama et al. | 252/67 |
| 4,501,674 | 2/1985 | Wu | 252/8.55 D |
| 4,567,213 | 1/1986 | Bhatia et al. | 523/160 |
| 4,584,175 | 4/1986 | Martenson | 422/9 |
| 4,677,177 | 6/1987 | Shibanai et al. | 527/300 |
| 4,698,279 | 10/1987 | Sumiya et al. | 428/411.1 |
| 4,744,913 | 5/1988 | Salvador et al. | 252/70 |
| 4,748,011 | 5/1988 | Baize | 423/228 |
| 4,774,345 | 9/1988 | Martins et al. | 556/132 |
| 4,834,799 | 5/1989 | Song | 106/22 |
| 4,892,775 | 1/1990 | Song | 195/428 |
| 4,975,211 | 12/1990 | Small, Jr. et al. | 252/49.6 |
| 4,978,969 | 12/1990 | Chieng | 346/1.1 |

Primary Examiner—William R. Dixon, Jr.
Assistant Examiner—Margaret V. Einsmann
Attorney, Agent, or Firm—Leydig, Voit & Mayer

[57] ABSTRACT

An improved ink composition suitable for ink jet printing, wherein the improvement comprises the addition of a sufficient quantity of a secondary amine selected from the group consisting of diethyl amine, dipropyl amine, diisopropyl amine, and dibutyl amine to inhibit corrosion of metal placed in contact with said ink composition, without adversely affecting the printing characteristics of said ink. Also a method for reducing the corrosiveness of an ink composition suitable for ink jet printing, wherein the ink composition is normally corrosive to metal, comprising adding to said ink composition a sufficient quantity of such a secondary amine.

19 Claims, No Drawings

CORROSION INHIBITOR FOR JET INKS

FIELD OF THE INVENTION

This invention relates to the field of corrosion inhibitors, in general, as well as to the field of ink jet printing formulations In particular, this invention relates to ink jet printing formulations which contain corrosion inhibitors.

BACKGROUND OF THE INVENTION

Ink jet printing is a well-known technique by which printing is accomplished without contact between the printing device and the substrate on which the printed characters are deposited. This technique of noncontact printing is particularly well suited for application of characters onto irregularly shaped surfaces, including, for example, the bottom of beverage containers.

Describing briefly one technique for performing ink jet printing, a stream of droplets of ink are projected toward a surface and the trajectories of the droplets are controlled electronically so that the droplets are caused to form the desired printed image on a relatively movable substrate. Another technique of ink jet printing is to direct droplets on demand from a set of orifices at a relatively moving substrate.

In general, ink jet printing techniques impose rigid requirements on the ink compositions. To be suitable for use as a jet ink, the compositions must meet some or all of the requirements of viscosity, resistivity, solubility, compatibility of components and wetability of the substrate. Further, the ink must be quick drying and smear resistant and capable of passing through the ink jet nozzle without clogging. The ink should also permit rapid cleanup of the machine components with minimum effort.

Corrosion of metal parts is a problem presented in many industrial fields, including the field of ink jet printing. Heretofore, it has been difficult to develop ink jet printing formulations which do not promote undue corrosion of metal parts of the ink jet printing apparatus with which the printing ink comes into contact. Oftentimes it has been necessary to expend substantial time and effort in formulating each particular ink jet formulation to render the same acceptable from the standpoint of minimizing metal corrosion.

A need has therefore existed for corrosion inhibitors which could be incorporated into non-aqueous liquids, such as ink jet formulations, which corrosion inhibitors, while reducing corrosion of metal parts which come into contact with the ink jet formulation, would also not adversely affect the properties of the ink jet itself. As may be appreciated, ink jet formulations must meet very specific, stringent requirements with respect to many particular physicochemical properties, such as electrical conductivity, sonic velocity, viscosity, and the like. If a corrosion inhibitor has an effect on any such property, it may render the ink jet formulation unworkable, without reformulation, requiring the expenditure again, of large quantities of time and effort.

For general applications in fields not requiring such stringent control of physicochemical parameters, many compositions, including dialkyl amines, and derivatives and salts thereof, have been employed as corrosion inhibitors. For example, U.S. Pat. No. 4,975,211 discloses the use of diethylamine complexes of borated alkyl catechols as corrosion inhibitors in lubricating oils. Amine-complexed zinc salts of organic diacids, employing compounds such as zinc dibasate diethylamine, are disclosed in U.S. Pat. No. 4,774,345. U.S. Pat. No. 4,748,011 discloses the use of amines such as diethylamine and dipropylamine as corrosion inhibitors in natural gas formulations. U.S. Pat. No. 4,744,913 discloses the use of dipropylamine and dibutylamine as corrosion inhibitors in de-icing and anti-icing agents for aircrafts. U.S. Pat. No. 4,698,279 discloses the use of diisopropylamine in a back coating layer of magnetic recording tape, to improve the resistance of the magnetic layer to corrosion.

Diisopropylamine nitrite is disclosed as a corrosion inhibitor in a rust preventative, in U.S. Pat. No. 4,677,177. Organic phosphate adducts with diethylamine are discussed in U.S. Pat. No. 4,584,175 as extending corrosion protection to magnesium and its alloys, used in a plastic sheet for enveloping metal objects to be protected. U.S. Pat. No. 4,501,674 discloses the use of diethylamine as an ancillary agent for use in an enzyme system for reducing corrosion, when used in combination with crude oil additives. Diethylamine is also included in an absorption refrigeration system, as shown in U.S. Pat. No. 4,455,247. U.S. Pat. No. 4,433,127 shows room temperature curable silicon compositions which are effective for protecting copper and other metals from corrosion, the composition optionally containing dibutylamine.

U.S. Pat. No. 4,342,596 discloses the use of diisopropylamine in a metal-corrosion inhibiting composition for use as a non-petroleum based metal corrosion inhibitor. Diisopropylamine is also used in cooling water, as disclosed in U.S. Pat. No. 4,338,209, in combination with the metal corrosion inhibitor disclosed in that patent. U.S. Pat. No. 4,295,979 discloses the use of diethylamine as an activator which is believed to be incorporated into alkyl polysulfide used in corrosion inhibitors for gas wells. Diisopropylamine nitrite is again employed as a volatile corrosion inhibitor used in the manufacture of corrosion resistance ferromagnetic metal powders, in accordance with U.S. Pat. No. 4,253,886. U.S. Pat. No. 4,204,972, referring to published German application No. 2,532,228 simply states that dialkylamines such as dibutylamine are known to inhibit corrosion.

The use of disubstituted lower alkyl amines in carbon dioxide propellants, as corrosion inhibitors, is discussed in U.S. Pat. No. 4,161,458. The use of amines such as diethylamine, dipropylamine, and the like in forming certain corrosion inhibiting salts is discussed in U.S. Pat. No. 4,101,328. Ball point pen inks containing diethylamine salt as a corrosion inhibitor is disclosed in U.S. Pat. Nos. 4,077,807 and 4,077,727. U.S. Pat. No. 3,964,927 discloses the use of dibutylamine as a corrosion inhibitor in an electrolyte used in a lead dioxide-zinc rechargeable-type cell and battery. Dibutylamine pyrophosphate is employed as a corrosion inhibitor in an aqueous system, as disclosed in U.S. Pat. No. 3,935,125. U.S. Pat. No. 3,925,223 discloses the use of dipropylamine and dibutylamine as corrosion inhibitors in hydraulic fluids. Diisopropylamine nitrite is disclosed as a corrosion inhibitor used in corrosion inhibiting paper in U.S. Pat. No. 3,891,470.

Despite all of the foregoing uses of dialkyl amines, such as diethyl amine, dipropyl amine, and dibutyl amine, in corrosion inhibiting formulations, either directly, or as salts, derivatives, or complexes, over many years, such amines have never been employed for purposes of corrosion inhibition in ink jet formulations.

SUMMARY OF THE INVENTION

It has now been surprisingly discovered that if diethyl amine, dipropyl amine, diisopropyl amine, or dibutyl amine is incorporated into non-aqueous, ink jet printing formulations, said amine may be introduced into said compositions at a level sufficient to inhibit corrosion of metal, such as stainless steel, placed in contact with said ink formulation, while having essentially no effect upon the physicochemical properties of the ink jet formulation. The ability to add such amines in sufficient quantity to inhibit corrosion, while not significantly affecting the physicochemical properties of the ink jet formulation is of great importance, as it allows previously formulated jet ink compositions to be rendered corrosion resistant, without the need to totally reformulate the ink composition.

Accordingly, the present invention provides improved ink jet ink compositions wherein a sufficient amount of a dialkylamine selected from the group consisting of diethyl amine, dipropyl amine, diisopropyl amine, or dibutyl amine is incorporated therein to reduce the corrosiveness of the ink without adversely affecting the printing characteristics of said ink.

DETAILED DESCRIPTION OF THE PREFERRED EMBODIMENTS

As indicated, the present invention provides ink jet formulations that have a reduced tendency to promote corrosion of metal that comes into contact with the ink jet formulations. By use of the specific secondary amine corrosion inhibitors, it is possible to leave unaffected the beneficial properties of the ink jet ink formulation, such as adhesion and drying time of the ink. Also, the corrosion inhibitors of use in the present invention do not destabilize the ink, as they do not substantially affect the critical physicochemical properties of the ink jet formulation.

Thus, a normally corrosive ink jet ink formulation may be rendered less corrosive, or essentially noncorrosive, by adding thereto a corrosion reducing amount of a secondary amine selected from the group consisting of diethyl amine, dipropyl amine, diisopropyl amine, dibutyl amine, or mixtures thereof. By use of such secondary amines in the ink jet formulations, corrosion of the metal parts of an ink jet printing apparatus that are susceptible to corrosion, as due to exposure to chloride from components of the ink jet formulation, such as dyes or electrolytes, is reduced or eliminated. Typically, the amount of secondary amine present in the ink formulation will be from about 0.1 to about 10.0 percent, based upon the total weight of the ink formulation, preferably from about 0.5 to about 2.0 percent, and most preferably from about 1.0 to about 1.5 percent.

The ink jet composition comprises a carrier and a colorant that is soluble or dispersable in the carrier. Typically the colorant will be a dye or a pigment.

The ink jet compositions may also contain a resin binder component such as a vinyl acetate copolymer to improve adhesion between the printed image and the substrate on which the printing is effected. A variety of such resin binders may be employed, as described in U.S. Pat. Nos. 4,210,566, 4,260,531, 4,567,213 and 4,070,322, all of which are incorporated by reference. Useful resin binders include resins that are soluble in the carrier.

Preferable resin binders include those having pendant amino groups, such as those disclosed in U.S. Pat. No. 4,834,799, which is also incorporated by reference. One resin useful in ink jet ink formulations is sold under the trademark JONCRYL ®, which is a copolymer of a methacrylic or acrylic ester and acrylic acid.

The amount of resin binder in the compositions of the present invention is not critical and may be varied from about 5 to about 20 percent, by weight, based upon the total weight of the composition. Preferably, the amount of resin binder will be from about 9 to about 12 percent and most preferably from about 9 to about 10 percent.

A variety of carriers may be utilized. The carrier is not critical so long as it is capable of dissolving or dispersing the colorant and dissolving the binder resin, if present. One principal carrier is typically a mixture of a lower alcohol and a lower ketone, each preferably having no more than 10 carbon atoms. An alcohol which typifies those that are useful is methyl alcohol. Useful ketones in the present invention include aliphatic ketones having no more than 10 carbon atoms, in straight or branched chain arrangement, such as acetone, methyl ethyl ketone, methyl isobutyl ketone or an alicyclic ketone, such as cyclopentanone, cyclohexanone, or other alicyclic ketones having up to 10 carbon atoms.

The amount of carrier employed usually is in the range of about 40 to about 90 percent by weight of the composition, and in the preferred practice is in the range of about 65 to about 85 percent by weight of the composition.

Suitable colorants include carbon black and dye-stuff components that are soluble or dispersable in the solvent, such as solvent black 7 and solvent blue 36 dyes. Preferred solvent black 7 dyes are typically selected from dyes such as ATLASOL spirit nigrosine B base. One skilled in the art will be able to ascertain other such operable dyes through reference to information as contained in the *Color Index Guide*.

The amount of colorant employed in the practice of the invention is not critical and can be varied within relatively broad ranges. In general, the colorants are present in the composition in amounts varying from about 0.5 to about 5 percent and preferably from about 1.5 to about 2.5 percent, based on the weight of the ink compositions.

Suitable conductivity control components which optionally may be present include, among others, soluble ionizable salts such as alkali metals and alkaline earth metal halides, nitrates, thiocyanates, acetates, propionates, and amine salts. An example of such salts is lithium nitrate. The salts are typically used in an amount of 0.1 to about 2 percent by weight of the composition and preferably from about 0.3 to about 0.8 percent by weight.

While not essential to the practice of the present invention, the ink composition of this invention can also be formulated to include evaporation retardants for the purpose of retarding evaporation of the solvents. Such retardants are conventional in ink jet printing compositions. Typical evaporation retardants include glycol ethers, glycol esters or combinations thereof. Especially preferred is diethylene glycol monoethyl ether.

The evaporation retardant typically is present in an amount up to about 10 percent by weight based on the weight of the composition, and preferably from about 2 to about 4 percent by weight.

As will be appreciated by those skilled in the art, the ink composition of the present invention also may be formulated to include one or more surfactants to impart desirable characteristics to the liquid ink composition. Preferred surfactants include non-ionic surfactants such as fluorinated alkyl esters such as "FLUORAD FC 430".

The ink jet inks may also contain various other optional components such as resistivity control agents to adjust the electrical resistivity of the ink. Electrolytes can be added to adjust the specific resistivity of the ink. Usable electrolytes include dimethylamine hydrochloride and hydroxylamine hydrochloride.

It also may be desirable to add humectants, such as ethylene glycol or propylene glycol methyl ether, to prevent the ink jet tip from drying. Small amounts of organic cosolvents may also be added to improve drying time and reduce surface tension. Suitable cosolvents include n-methyl-2-pyrrolidone and butanol. Other conventional components may also be employed in the ink jet ink compositions.

In practice, ink jet printing may be applied to several different types of substrates, such as paper, glass, metal, and plastic.

In general, the inks of the present invention exhibit the following characteristics for use in ink jet printing systems: (1) a viscosity from about 1.6 to about 7 centipoises (cps) at 25° C, (2) an electrical resistivity from about 50 to about 2,000 ohms-cm, (3) a sonic velocity from about 1,200 to about 1,700 m/s, and (4) a surface tension below 28 dynes/cm.

Inks of particular utility in which the secondary amine corrosion inhibitors may be employed are those disclosed in U.S. Pat. No. 4,892,775.

Having described the basic concepts of the invention, reference is now made to the following nonlimiting Examples which are illustrative of ink compositions according to the present invention which are effective in ink jet printing onto various substrates.

EXAMPLE 1

|  | % |
|---|---|
| Methyl Ethyl Ketone (carrier) | 39.35 |
| Methanol (carrier) | 24.63 |
| Dimethylamine HCl (electrolyte) | 0.8 |
| H8-370 Polymer (Videojet Systems)* | 26.72 |
| Propyleneglycolmonomethyl Ether (humectant) | 4.1 |
| FC430 (In 10% MEK) (3M Co.) (surfactant) | 0.9 |
| Plasticizer 8 (Monsanto) (plasticizer) | 0.5 |
| Solvent Black 7 (Atlantic Dye Co.) (dye) | 2.0 |
| Diethylamine (Aldrich) (inhibitor) | 1.0 |
|  | 100.00 |

*H8-370 Polymer (Videojet Systems) is described in detail in U.S. Pat. No. 4,834,799.

When the ink jet ink composition of the present Example is placed into contact with stainless steel plates and printer parts, substantially no corrosion results whereas an otherwise identical composition, but not containing the diethylamine, causes deep pits and significant degradation of the stainless steel to occur.

EXAMPLE 2

|  | % |
|---|---|
| Methylethyl Ketone (carrier) | 38.1 |
| Methanol (carrier) | 28.5 |
| Hydroxylamine Hydrochloride (electrolyte) | 1.0 |
| Joncryl 67 (Johnson Co.) (binder resin) | 4.0 |
| Varcum 8357 (BTL Co.) (phenolic resin) | 13.0 |
| Propylene Glycol Methyl Ether (humectant) | 5.0 |
| N-Methyl-2-Pyrrolidone (cosolvent) | 2.0 |
| Santicizer 8 (Monsanto) (plasticizer) | 2.0 |
| FC-430 (3M Co.) (surfactant) | 1.0 |

EXAMPLE 2-continued

|  | % |
|---|---|
| BYK 065 (defoamer) | 0.9 |
| Solvent Black 5 (Atlantic Co.) (colorant) | 3.0 |
| Diethylamine (Aldrich Corp.) (inhibitor) | 1.5 |
|  | 100.00 |

When the ink jet ink composition of the present Example is placed into contact with stainless steel plates and printer parts, substantially no corrosion results whereas an otherwise identical composition, but not containing the diethylamine, causes deep pits and significant degradation of the stainless steel to occur.

What is claimed is:

1. An improved non-aqueous ink composition suitable for ink jet printing, wherein the improvement comprises the addition of a sufficient quantity of a secondary amine selected from the group consisting of diethyl amine, dipropyl amine, diisopropyl amine, and dibutyl amine to inhibit corrosion of metal placed in contact with said ink composition, without adversely affecting the printing characteristics of said ink.

2. The composition of claim 1 wherein the secondary amine is diethyl amine.

3. The composition of claim 1 wherein the secondary amine is dipropyl amine.

4. The composition of claim 1 wherein the secondary amine is diisopropyl amine.

5. The composition of claim 1 wherein the secondary amine is dibutyl amine

6. A method for reducing the corrosiveness of a non-aqueous ink composition suitable for ink jet printing, wherein the ink composition is normally corrosive to metal, comprising adding to said ink composition a sufficient quantity of a secondary amine selected from the group consisting of diethyl amine, dipropyl amine, diisopropyl amine, and dibutyl amine to reduce the corrosiveness of said ink composition to metal placed in contact with said ink composition, without adversely affecting the printing characteristics of said ink.

7. The method of claim 6 wherein the secondary amine is diethyl amine.

8. The method of claim 6 wherein the secondary amine is dipropyl amine.

9. The method of claim 6 wherein the secondary amine is diisopropyl amine.

10. The method of claim 6 wherein the secondary amine is dibutyl amine.

11. An ink composition suitable for ink jet printing comprising a non-aqueous carrier, a colorant that is soluble or dispersable in said carrier, and a sufficient quantity of a secondary amine selected from the group consisting of diethyl amine, dipropyl amine, diisopropyl amine, and dibutyl amine to reduce the corrosiveness of said ink composition to metal placed in contact with said ink composition.

12. The ink of claim 11 also comprising a resin binder that is soluble in said carrier.

13. The ink composition of claim 12 wherein said carrier comprises a lower alcohol and a lower ketone.

14. The ink compositions of claim 13 further comprising a conductivity control component and a drying control component.

15. The ink composition of claim 14 wherein said conductivity control component comprises a soluble ionizable salt.

16. The ink composition of claim 14 wherein said drying control component is selected from the group consisting of glycol ethers.

17. The ink composition of claim 11 having a viscosity from about 1.6 to about 7.0 cps at 25° C., an electrical resistivity from about 50 to about 2000 ohms-cm, a surface tension below 28 dynes/cm, and a sonic velocity ensuring proper nozzle resonance of about 1200 to about 1700 m/sec.

18. The ink composition of claim 13 wherein said ketone is selected from the group consisting of acetone, methyl isobutyl ketone, methyl ethyl ketone, cyclopentanone, and cyclohexanone.

19. The ink composition of claim 13 wherein said alcohol is present in an amount from about 10 to about 50 weight percent and said ketone is present in the amount of about 50 to about 10 weight percent, said percentage being based upon the total weight of said composition.

* * * * *